Dec. 13, 1966    R. W. BLAIR    3,291,493
END FACE SEAL
Filed July 27, 1965    2 Sheets-Sheet 1
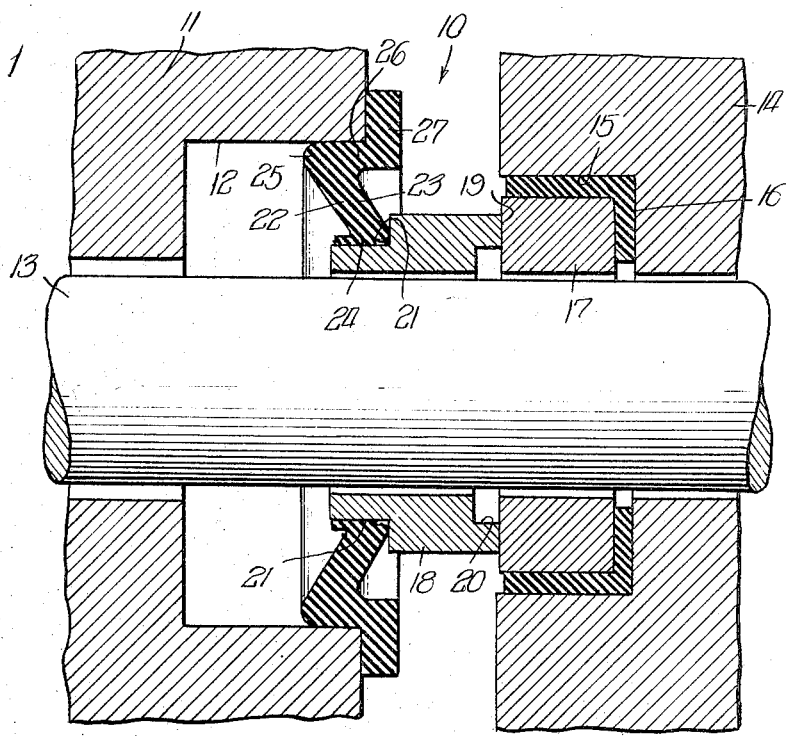
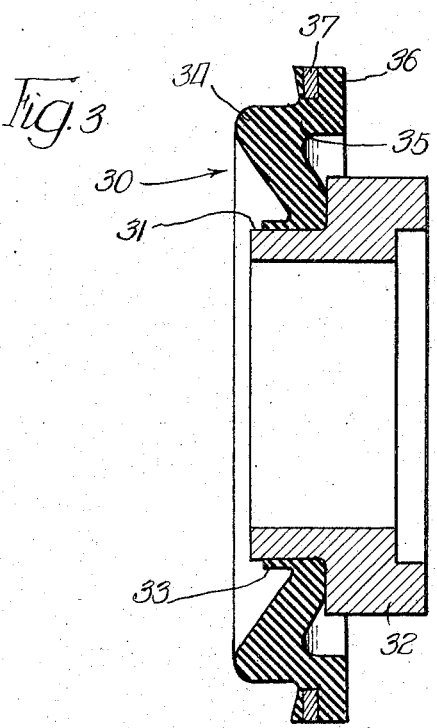
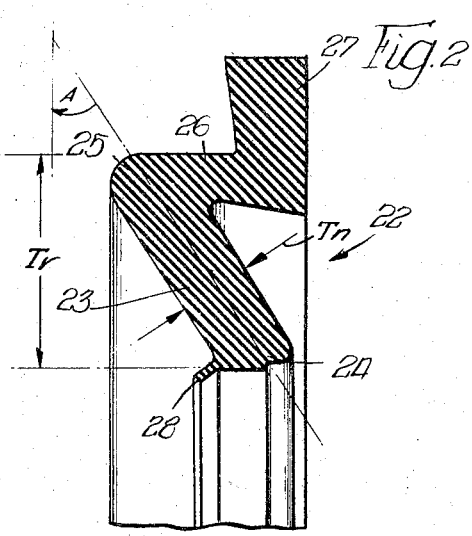
Inventor:
Richard W. Blair,
By Grist, Lockwood, Greenawalt & Dewey
Attys Dec. 13, 1966   R. W. BLAIR   3,291,493
END FACE SEAL
Filed July 27, 1965   2 Sheets-Sheet 2
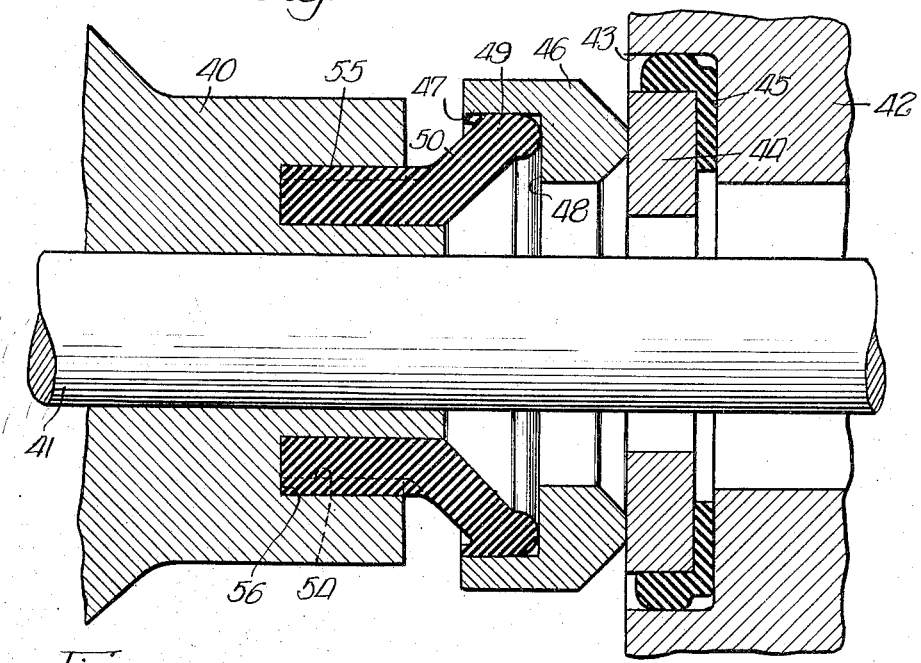
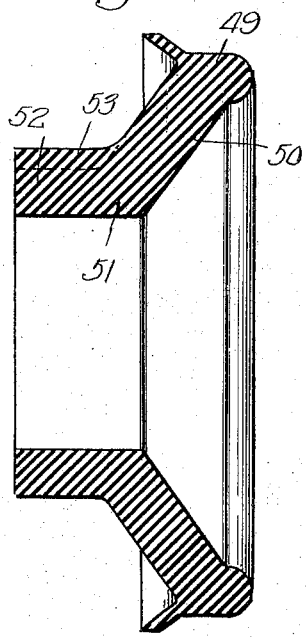
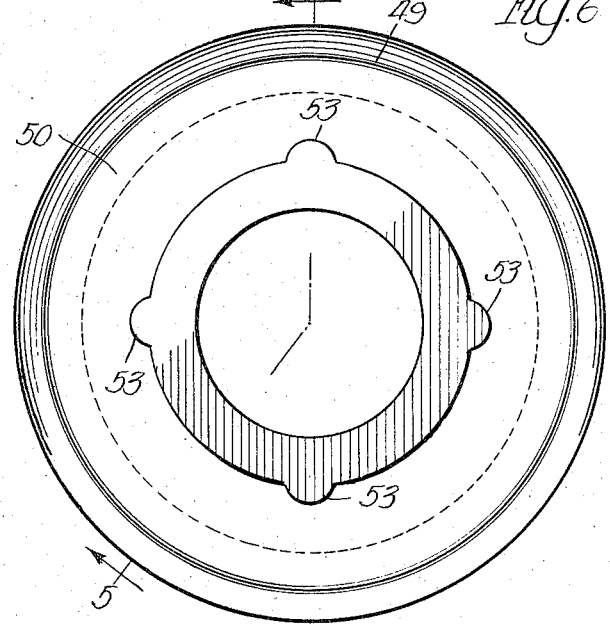
Inventor:
Richard W. Blair,
By Grist, Lockwood, Greenawalt & Dewey
Attys

United States Patent Office 3,291,493
Patented Dec. 13, 1966

3,291,493
END FACE SEAL
Richard W. Blair, Arlington Heights, Ill., assignor to Chicago Rawhide Manufacturing Company, Chicago, Ill., a corporation of Illinois
Filed July 27, 1965, Ser. No. 475,213
7 Claims. (Cl. 277—92)

This invention is directed to a new and improved form of end face seal assembly of the rotary type, the assembly being of a design based on that disclosed in the copending applications, Serial No. 155,640, (now Patent 3,241,843) and Serial No. 282,278, (now Patent 3,241,844) filed November 29, 1961 and May 22, 1963, respectively, the disclosures of which are hereby incorporated by reference.

In the former application, the seal assembly includes a sealing ring supported on a machine part by a frusto-conical secondary sealing member which serves to hold the ring against rotation relative to the part on which it is supported, and also provides biasing force and fluid-tight sealing between the ring and machine part on which it is supported. The latter of these applications discloses among other things, a novel means formed on the outer periphery of the ring to facilitate installation in a machine housing. Both of these designs are quite uncomplicated requiring a minimum of parts, and have performed admirably.

The present invention relates to a new and improved mounting arrangement for the end face seals of the above types which are particularly adapted for use in small shaft size applications. While effectively mounting the seal for operation with a mating face, the mounting means does not interfere with the effective use of the entire frusto-conical secondary seal portion which supports the sealing ring, serves as a secondary seal, and serves to bias the sealing face against the mating ring. Through the present novel design, the usual gasket material for seals with metal-type casings is unnecessary as a rubber-to-metal seal is provided which not only forms a good gasket but is also not susceptible of being joined by corrosion as in metal-to-metal designs. In addition to the foregoing features, the secondary ring of the present invention is uniquely designed for substantially constant sealing force over a wide range of design values making it particularly applicable for biasing a sealing ring into engagement with an axially fixed mating ring wherein the plane of face engagement is determined by the positioning of the mating ring. In such application, the question of seal stability is not as prominent, however, spring rate or sealing force becomes a dominant factor to consider and the novel design ratio provides a relatively constant sealing force over a broad range of deflections.

It is an object of this invention to provide a new and improved end face seal of uncomplicated design.

It is an object of this invention to provide a new and improved end face seal assembly having an integrally attached mounting portion which does not impede or interfere with the novel operation of the frusto-conical secondary sealing member.

A further object of this invention is to provide a new and improved mounting for an end face seal wherein a face is held in fluid-tight engagement with a mating ring through a frusto-conical secondary sealing member which serves to bias the sealing ring as well as hold it fluid-tightly in a machine housing.

Still another object of this invention is to provide a novel design thickness ratio for a resilient type secondary sealing member thereby to provide substantially optimum constant force loading conditions at the sealing face over a fairly wide range of deflections.

Still a further object of this invention is to provide a new and improved seal assembly having a frusto-conical secondary sealing member holding a sealing ring in face-to-face engagement with a mating ring, the frusto-conical sealing member having a mounting means formed integrally therewith at one of the peripheries.

It is a further object of this invention to provide a new and improved mounting means for an existing type seal which mounting means includes a radially extending flange provided with suitable rigidifying means to preclude collapse thereof.

Other objects not specifically set forth will become apparent from the following detailed description of the invention made in conjunction with the accompanying drawings wherein like reference characters refer to like parts:

FIG. 1 is an axial cross sectional view of the seal assembly of the present invention with the shaft being shown in full elevation;

FIG. 2 is a free body diagram of the secondary sealing member embodying the unique mounting flange;

FIG. 3 is a longitudinal cross sectional view of a sealing ring and secondary sealing member having a rigidifying means molded in the mounting flange;

FIG. 4 is a longitudinal cross section of a seal assembly having a modified form of mounting flange on the secondary seal;

FIG. 5 is a cross sectional view of the secondary seal of FIG. 4 taken generally along the lines 5—5 of FIG. 6; and FIG. 6 is a rear elevational view of the secondary sealing member of FIG. 5 illustrating a drive means formed on the mounting flange.

Referring now to FIG. 1, the seal assembly indicated generally at 10 includes a first machine part 11 such as a housing or the like formed with a central bore 12 for mounting a seal member. The bore 12 may be of uniform diameter throughout the entire machine part 11 or may be of reduced diameter to mount a shaft 13 for rotation.

A second machine part 14 may be provided with a counter bore portion 15 mounting a back-up gasket member 16 which seals the outer circumference and one axial face of a mating ring 17. The machine part 14 rotates relative to machine part 11 with one of the machine parts being, for example, a companion flange on a pump impeller while the other may be the pump housing. In either event, relative rotation occurs between the parts on rotation of the shaft 13.

Ingress of foreign material and egress of fluid between the parts is precluded by a sealing ring 18 having an end face portion 19 in sliding engagement with the mating ring 17. The ring 18 may be of any desired cross sectional shape such as having a relieved portion 20 at its face in order to reduce the total area of contact and in some instances provide a pressure balancing effect.

The rearward portion of the sealing ring 18 is turned to a reduced diameter at 21 to provide diverging radially and axially extending wall portions which co-operate with a secondary sealing element 22 having a generally frusto-conical body. The frusto-conical body 23 terminates in an inner peripheral portion 24 tightly received about the reduced section 21. The inner peripheral portion 24 of the secondary sealing element 22 may be provided with a lip-like projection 28 which holds the sealing face and secondary seal in assembled relation throughout shipment and installation.

The outer peripheral portion 25 of the frusto-conical secondary sealing member 22 is joined by an integral annular section 26 which is thin relative to the radial thickness of the secondary member, to a radially extending mounting flange 27 adapted to over-lap the radially extending face of the housing or machine part 11.

It is evident from inspection of the embodiment of FIG. 1 that the radial flange 27 serves as a stop which limits the insertion of the secondary sealing member into the bore 12. Accordingly, the bore 12 need not be stepped as are prior art designs, or if stepped, the flange 27 will preclude contact therewith. In this manner, the coaxial and concentric placement of the seal at assembly is assured.

A modified form of the invention is illustrated in FIG. 3 wherein the secondary sealing element 30 is positioned around a circumferential portion 31 of a sealing ring 32. The secondary sealing element 30 may be formed with the lip-like projection 33 or the equivalent at its inner periphery for the purposes previously stated. At its outer periphery 34, it is joined through a thin section 35 to a radially extending flange 36 which co-operates with a cylindrical cavity or bore such as shown in FIG. 1 to permit positioning of the sealing element for operative engagement with a mating ring or similar sealing surface.

The radially extending mounting flange 36 is provided with an annular ring 37 which is molded into the flange or secured in any suitable fashion. The ring 37 rigidifies the outer circumference of the flange and in high pressure and heat applications prevents the collapse of the seal into the bore. The ring 37 may be formed from any desired material such as metal, hard rubber, plastic or the like.

In each of the above embodiments, the elastomeric secondary sealing element is preferably formed to a definite ratio of radial thickness compared to the axial thickness measured normal to the frusto-conical surface. Also, the angularity should preferably be within prescribed limits. These figures have been found by extensive research to be of particular significance if the most desirable operational characteristics are to be obtained.

As briefly noted, in end face sealing where a sealing ring co-operates with a fixed mating ring, stability becomes less dominant in design as the plane of contact will always be determined by the mating ring. Sealing force at the faces, however, has an optimum value which weighs heavily on the ultimate design. For example, the sealing force may be of the order of five to seven pounds total, distributed over the sealing face area, with such optimum force being reached after an initial deflection of about 0.1 inch. Assuming the parts are under tolerances such that the total deflection can vary by up to 0.10 inch, additional, the present seal when designed within parameters to be given will maintain substantially the same sealing force at that level. To enjoy the desired relatively constant force at the sealing face in the present design, certain limitations are preferred.

The frusto-conical portion or effective body portion of the secondary sealing ring must be formed to definite angles. In the unflexed or free state the angle that the neutral axis of a half section of the elastomeric secondary sealing and biasing element makes with a plane perpendicular to the axis of generation should not exceed about 45° nor be less than about 20°. This angle is indicated in FIG. 2 by reference character "A." This is more popularly known as the molded angle, and is referenced to the neutral axis of the effective cross section inasmuch as variances in the external surfaces can occur. Coupled with these angularity requirements, the radial thickness of a half section as compared to its axial thickness taken normal to the neutral axis which in the illustrated design is parallel to external surfaces should be greater than about 2.25, however, no greater than a value of about 5. These thicknesses are represented in FIG. 2 by the symbols $T_r$ and $T_n$ respectively. The above described relationship may be expressed in mathematical form as: $2.25 < T_r/T_n < 5$. Seals formed within the above parameters will provide substantially constant sealing force at the face after initial deflection of the order described above.

If the thickness ratio should exceed about 5, the elastomeric secondary sealing member begins to function as a diaphragm and has a poor spring rate and hence inadequate force at the sealing faces. In addition, the frictional driving force is reduced and ring support is poor at best. Accordingly, above this value the seal will not function in accordance with the desired capabilities. In designs having a ratio value of less than about 2.25, the spring rate tends towards being linear relative to loading force and hence the highly desirable constant load force over a wide range of deflections is not present to the desired extent. Stability is enhanced, however, but this is of no particular importance since the mating ring is axially fixed and determines the position of the plane of sealing contact.

In one specific embodiment, a flange-type seal as illustrated and described in FIG. 1 provided a constant force of about 7 and ½ pounds over a total of 0.1 inch of deflection after the usual initial deflection at installation. The sealing force varied on the average only about plus or minus one pound which, when spread over the area of the sealing faces, constitutes very little change. In shorter increments of axial travel per inch of seal length, the sealing force would have little or no variance thereby permitting a substantially constant force to be established at the sealing faces, which force can be selected to be an optimum value at design. When load is plotted vs. axial travel, the curve rises almost linearly and then flattens or plateaus at a substantially constant force over a substantial range of operating deflections.

It is to be appreciated that the above described seal is unique in that it is easily slip-fitted into an existing housing. This is particularly helpful when such seal is used as a replacement in home appliances such a dishwashers, automatic washers and the like as the repairman is not required to carry special tools to facilitate expedient installation. Moreover, the use of the mounting flange insures that the seal will be appropriately placed for a true running fit with a co-operating mating ring with a constant force for the life of the seal. The use of the lip-like projection on the inner periphery of the rings permits hand assembly of the sealing ring and secondary sealing member and insures that the two will remain in properly assembled relationship throughout shipment and installation.

A modified form of the invention is illustrated in FIG. 4. A first machine part 40 is mounted on a shaft member 41 for rotation therewith. The machine part 40 may comprise a companion flange, cylindrical mounting portion of an impeller or the like. The shaft 41 may be rotatably supported in a machine housing 42 which is provided with a counter bore 43 to support a mating ring 44 with a suitable backing or gasket 45 interposed. A sealing ring 46 is provided with an axially extending surface 47 and radially extending surface 48 for abutment with an outer peripheral portion 49 of a secondary sealing member 50 having characteristics similar to that described in FIGS. 1–3. The inner peripheral portion 51 is provided with an axially extending mounting flange 52 which is generally cylindrical and provided with a plurality of ribs or flutes 53. An axially opening groove 54 is formed in the machine part 40 and is provided with semi-circular splined portions 55 to receive the ribs or flutes 53. In this manner, the flange is held against rotation relative to the cylindrical mounting portion 40.

It is to be pointed out that the embodiment of FIGS. 4–6 like the embodiment of FIGS. 1–3 operate in the manner described above. In effect, the mounting flange is positioned on the inner periphery. The present design provides a ready method and manner of mounting the secondary element by bottoming the same against the end wall 56 in the groove 64 to establish good sealing relation with an existing mating ring.

In each of the foregoing embodiments, the mounting flange does not affect or impair the operation or function of the secondary sealing element. When formed to the angularity given within given thickness ratios the biasing force remains substantially constant, static and dynamic fluid-tighteness is assured, as well as concentricity in mounting and operation.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. In an end face seal wherein an elastomeric drive and secondary sealing member has a first periphery thereof mounted in a rearwardly opening seat of a sealing ring, said seat being defined by divergent generally axially and radially directed surfaces, said elastomeric member having an effective frusto-conical body portion extending from said first periphery to a second periphery and subject to distortive axial and radial deflection upon installation of said seal on a machine part with said sealing ring in end face sealing engagement with a mating ring, the improvement comprising said elastomeric member between said peripheries having a ratio of radial thickness of a half section relative to half section thickness measured normal to the neutral axis of said frusto-conical body portion which is in the range of from about 2.25 to about 5.00, and said frusto-conical body portion having a molded angle which is in the range of from about 20° to about 45°, whereby to provide constant force characteristics throughout the range of operative deflection of said elastomeric member.

2. The end face seal of claim 1 wherein said second periphery of said elastomeric member is formed with an axially projecting mounting portion of limited radial thickness as compared to the total radial thickness of said frusto-conical body portion to provide an axial holding force for said frusto-conical body portion in the installed condition of said seal.

3. The end face seal of claim 1 wherein said second periphery of said elastomeric member is formed with an axially projecting mounting portion of limited radial thickness as compared to the total radial thickness of said frusto-conical body portion to provide an axial holding force for said frusto-conical body portion in the installed condition of said seal, and terminal radial flange means joined with said mounting portion to enhance said holding force.

4. In an end face seal arrangement comprising a pair of machine parts mounted for relative rotation therebetween, a sealing ring spaced from one machine part and including a first sealing surface, a mating sealing surface forming a part of the other machine part and in sealing engagement with said first sealing surface, elastomeric ring means supporting said sealing ring in nonrotative relation on said one machine part while simultaneously urging said sealing ring into substantially constant force engagement with said mating sealing surface, said elastomeric ring means being of generally effective frusto-conical shape and having inner and outer peripheries engaging said sealing ring and one machine part, the imrpovement comprising said elastomeric ring means being characterized by having a ratio of radial thickness of a half section relative to half section thickness measured normal to the neutral axis which falls in the range of about 2.25 to about 5.00, and said elastomeric ring means having a molded angle falling between about 20° and 45° thereby to provide a relative constant force load at said first and mating sealing surfaces.

5. The end face seal arrangement of claim 4 wherein one of said peripheries of said elastomeric ring means which engages said one machine part is formed with an axially projecting mounting portion of limited radial thickness as compared to the total radial thickness of a half section of said elastomeric ring means and is in engagement with said one machine part to provide an axial holding force for said elastomeric ring means.

6. The end face seal arrangement of claim 4 wherein one of said peripheries of said elastomeric ring means which engages said one machine part is formed with an axially projecting mounting portion of limited radial thickness as compared to the total radial thickness of a half section of said elastomeric ring means and is in engagement with said one machine part to provide an axial holding force for said elastomeric ring means, and terminal radial flange means joined with said mounting portion and engaging a radial surface of said one machine part to enhance said holding force.

7. The end face seal arrangement of claim 4 wherein one of said peripheries of said elastomeric ring means which engages said one machine part is formed with an axially projecting mounting portion of limited radial thickness as compared to the total radial thickness of a half section of said elastomeric ring means and is received in an axially facing groove means of said one machine part.

References Cited by the Examiner

UNITED STATES PATENTS

| | | | |
|---|---|---|---|
| 2,214,243 | 9/1940 | Casson | 277—90 |
| 2,289,274 | 7/1942 | Krug | 277—42 |
| 2,710,206 | 6/1955 | Huber | 277—92 |
| 2,871,039 | 1/1959 | Payne | 277—92 |
| 2,984,506 | 5/1961 | Andersen et al. | 277—88 X |
| 3,180,648 | 4/1965 | Kupfert et al. | 277—92 |
| 3,185,488 | 5/1965 | Christensen et al. | 277—42 |
| 3,241,843 | 3/1966 | Hatch et al. | 277—92 |
| 3,241,844 | 3/1966 | Morley | 277—92 |

LAVERNE D. GEIGER, *Primary Examiner.*

J. S. MEDNICK, *Assistant Examiner.*

Dedication 3,291,493.—*Richard W. Blair*, Arlington Heights, Ill. END FACE SEAL. Patent dated Dec. 13, 1966. Dedication filed Mar. 16, 1972, by the assignee, *Chicago Rawhide Manufacturing Company.*
Hereby dedicates to the Public the entire term of said patent.
[*Official Gazette July 25, 1972.*]